United States Patent [19]
Gerry

[11] 4,010,491
[45] Mar. 1, 1977

[54] AUTOMATICALLY RETRACTABLE TAPE IN SOUND-SLIDE MEANS

[76] Inventor: Martin E. Gerry, 13452 Winthrope St., Santa Ana, Calif. 92705

[22] Filed: Mar. 26, 1976

[21] Appl. No.: 671,015

[52] U.S. Cl. .................................. 360/1; 242/201; 242/203; 353/19
[51] Int. Cl.² .................. G11B 13/04; G11B 23/04
[58] Field of Search ................. 353/19; 352/1, 5, 2, 352/6, 37; 360/1, 2, 82, 85, 86; 242/202, 203, 201

[56] References Cited
UNITED STATES PATENTS

| | | | |
|---|---|---|---|
| 3,177,768 | 4/1965 | Hallamore | 242/203 |
| 3,191,494 | 6/1965 | Schwartz | 353/19 |
| 3,389,915 | 6/1968 | Owen | 242/201 |
| 3,517,991 | 6/1970 | Bender | 353/19 |

Primary Examiner—Jay P. Lucas

[57] ABSTRACT

A slide and magnetic tape retainer provides capability of insertion of a mounted transparency and has a spiral spring type tape that is self retractable, after being transported, to its original position. The tape is guided for non-interference with the slide or transparency within the retainer by means of rollers. Mechanical energy is stored in the tape when a portion of it has been transported, and upon release of the transported portion the tape returns to its original position by itself without use of any mechanical aids. Transportation of the tape occurs when a motor is energized by a push button and a cam on the motor in cooperation with a switch times the recording or reproducing period of the tape when such tape is also in cooperation with a magnetic head.

21 Claims, 5 Drawing Figures

AUTOMATICALLY RETRACTABLE TAPE IN SOUND-SLIDE MEANS

BACKGROUND OF THE INVENTION

This invention is in the field of audio-visual retainers for accommodating a recording tape and a mounted slide.

The prior art discloses audio-visual combinations of slide and tape, however such combinations are complex and require complex external drive and rewind mechanisms.

Additionally, the magnetic head generally has to scan a tape area since the slide is required to be motionless, which calls for complex mechanism to accomplish horizontal-vertical head motion, or spiral head motion and return.

Certain prior art devices having stationary heads always make necessary means for rewinding the tape. This results also in added structural complexity, loss of time, and degraded reliability of operation.

SUMMARY OF THE INVENTION

Accordingly, a stationary head is provided in combination with a tape and slide retainer wherein a magnetizable tape is self retractable after being transported.

A driven wheel having a post integral therewith at its center is held within the retainer wherein the post is rotatable. Another post in the retainer has one end of the tape attached to it, such other post being fixed, the other end of the tape being attached to the post integral with the driven wheel.

When the driven wheel is rotated by an impeller wheel attached to a motor that is energized, the tape is transported past the slide and guided by rollers within the retainer to accumulate tape in a spiral fashion about the post that is integral with the driven wheel.

When the driven wheel and impeller wheel are decoupled upon ejection of the retainer from a projector, the accumulated tape is retracted by the tape residual about the fixed post that has been drawn into a tight spiral spring wherein the spiral turns of tape are substantially in cooperation storing energy in such tight spiral spring. This effects retraction of the tape accumulated about the post integral with the driven wheel by sudden release of the stored mechanical energy.

Impeller and driven wheels have roughened peripheries or gear teeth thereat for preventing any slippage of the tape.

As the tape is transported, a head is in cooperation with the magnetizable surface of the tape to either record or reproduce a sound track.

The tape is of spring type resilient material having a film of magnetizable material disposed on one major surface of the resilient material. A coating of plastic material may be interposed and attached to the resilient material so that the magnetizable material is disposed over the surface of the coating.

DETAILED DESCRIPTION

Figures 1, 2, 3, 4:
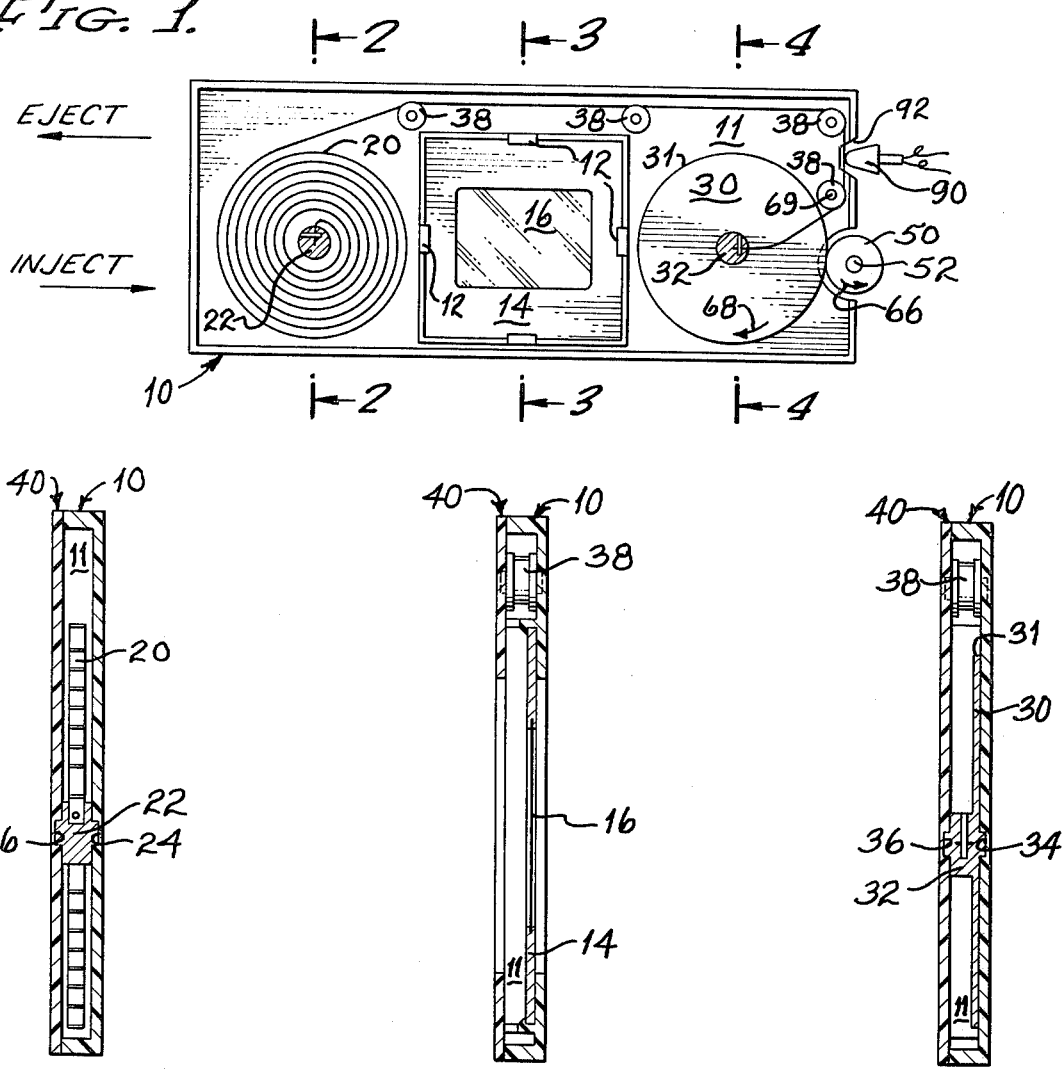
FIG. 1 is an elevation view of a slide and magnetic tape retainer according to this invention.
FIG. 2 is a cross-section view taken at plane 2—2 of FIG. 1.
FIG. 3 is a cross-section view taken at plane 3—3 of FIG. 1.
FIG. 4 is a cross-section view taken at plane 4—4 of FIG. 1.

Referring to FIGS. 1, 2, 3 and 4, retainer 10 for a slide having a self retractable tape assembly is provided. The retainer is usually of plastic material for effecting economy, though other materials can be used.

This retainer can be used in a still impage slide projector of the Kodak Carousel type or with a Sawyer projector type, but with sound added. It may also be used as the sound recording or reproducing means shown in U.S. Pat No. 3,526,454.

Retainer 10 has recess 11 within it so that the several components discussed below may be installed therein.

Tabs 12 integral with retainer 10 are provided for holding fixed in position slide holder 14 which as mouned therein slide or transparency 16.

Tape 20 comprising a ribbon type spring made preferably from non-magnetic material such as beryllium copper, may have a plastic coating on one surface thereof such as mylar upon which an adherent coating of magnetizable material such as iron oxide is attached. Optionally, the plastic coating can be deleted. The spring material may be of other materials having suitable resiliency and restoring forces as long as recording and reproducing capability on and from the magnetizable material is not impaired.

Post as at 22 has one end of tape 20 attached thereto. This post is fixed in position to the retainer by means of epoxy resin or utilizing such post with a rectangular end within a rectangular depression at 24 of retainer 20, to enable tightening of tape 20 into a smaller diameter spiral than shown in FIG. 1 when tape 20 is transported as discussed subsequently. The other end of post 22 may be secured in depression 26 of cover 40.

Driven wheel 30 is parallel and adjacent to inner surface of retainer 10. Such driven wheel has a roughened outer periphery at 31 or may have gear teeth at such outer periphery. A post as at 32, free to rotate within depressions 34 and 36 of retainer 10 and cover 40 respectively is provided as integral with wheel 30. The other end of tape 20 is attached to post 32.

Rollers 38 are provided at various locations within retainer 10 which guide tape 20 during its translation. The rollers are supported by pins as at 69 about which they rotate freely, such pins being held securely in the main wall of retainer 10, the other end of the pins entering into comparable depressions within cover 40.

Cover 40 may be attached by screws, pins or snap fitted into the lip portion of retainer 40, none of such fittings being shown.

Figure 5:
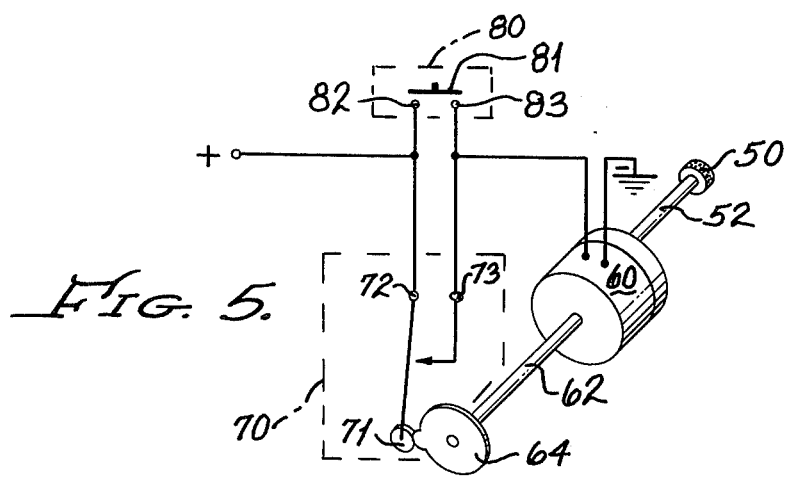
FIG. 5 is an electromechanical schematic showing means for transporting the tape of the retainer of FIG. 1.

Referring also to FIG. 5, impeller wheel 50 has a roughened periphery so as to cooperate with the periphery of wheel 30 and rotate wheel 30 when so driven, but the peripheries of both wheels 30 and 50 may have cooperating gear teeth instead for accommodation of heavier gage tape 20.

Wheel 50 is mounted on shaft 52 of motor 60. Motor 60 also has at its opposite end a shaft at 62 upon which is mounted cam 64.

Motor 60 has a built in reduction gear drive which causes shaft 52 to be driven a plural number of revolutions for one revolution of shaft 62 and hence one revolution of cam 64.

When impeller wheel 50 is driven in direction of arrow 66 due to motor 60 being energized, driven wheel 30 is driven in a direction indicated by arrow 68 to take up spring-type tape 20 spirally about post 32. The tape taken up about post 32 will be about half the total tape length, and consequently tape 20 remaining about post 22 will be reduced in diameter substantially up to the point where one portion of a spiral turn thereat cooperates with another portion of a spiral turn. Such reduced diameter of the tape-spring 20 about post 22 represents stored mechanical energy which is released when retainer 10 is ejected in view of termination of cooperation of wheels 30 and 50. This results in tape portion 20 wrapped about post 32 to be unwrapped and the tightened spring portion about post 22 pulling such wrapped portion back to its normal position by retracting the tape as initially positioned and as seen in FIG. 1.

A microswitch is provided at 70 having a roller 71 at the free end of contactor 72. Contactor 73 of the microswitch is normally noncooperating with respect to contactor 72 in view of the fact that roller 71 is in cooperation with the high portion of cam 64.

A push button for initiating motor 60 is provided at 80, having movable contactor 81 and stationary contactors 82 and 83. Contactor 82 is connected to positive potential of DC power supply, not shown, and to contactor 72. Contactor 83 is electrically connected to one side of motor 60 and to contactor 73, the other side of motor 60 being at negative DC potential denoted by the conventional ground symbol.

A conventional magnetic record-reproduce head as at 90 connected to electronics normal to a sound recording or reproducing circuit has its sensing portion in cooperation with the magnetic material surface of tape 20, the normal taughtness of tape 20 making any backing in support of the tape, at aperture 92 for head injection purposes, unnecessary.

When push button 80 is momentarily manually actuated, contactor 81 cooperates with contactors 82 and 83 thereby applying power to motor 60 and starting impeller wheel 50 rotating to drive wheel 30. At the same time cam 64 is driven to reposition roller 71 to its low portion, causing contactor 72 and 73 to cooperate. Such cooperation maintains power to motor 60 until a complete revolution of cam 64 occurs at which time contactors 72 and 73 open to remove power from motor 60. During the time cam 64 is rotated one revolution, impeller wheel 50 is rotated many revolutions so as to drive wheel 30 and cause it to make several revolutions so as to gather up about post 32 about half of length of tape 20.

During transportation of tape 20 past head 90, either recording of a sound track on the tape will be made or reproduction of an already recorded sound track will be sensed depending whether head 90 is connected in the recording mode or the reproduce mode, and the tape contents. A typical recording or reproducing circuit applicable may be found in U.S. Pat. Nos. 3,526,454, 3,251,263 or 3,332,319.

It is approximated that wheel 30 can be driven so as to average about one inch of tape 20 per second, with about 15 inches of tape 20 being transported past head 90, and about a similar quantity of tape stored in tightened manner about post 22. Practically, sufficient tape can be stored about post 22 if made reasonably thin, to enable a sound track of some 30 seconds to be obtained in a space the area of which is about 2 × 2 inches.

I claim:

1. In combination, a slide and magnetic tape retainer, comprising:
    means integral with the retainer for securing the slide; and
    a magnetizable tape which is also a self retractable spiral spring.
2. The invention as stated in claim 1, including a cover attached to the retainer.
3. The invention as stated in claim 1, including rollers rotatably held by the retainer for guiding said tape past the slide without interfering therewith.
4. The invention as stated in claim 3, wherein the retainer has a second aperture exposing a portion of the tape and where said portion of tape is supported between a pair of said rollers.
5. The invention as stated in claim 1, wherein said tape comprises resilient material having a film of magnetizable material disposed on a surface of the resilient material.
6. The invention as stated in claim 5, including a plastic coating interposed between and attached to the resilient material and film.
7. The invention as stated in claim 1, wherein the self retractable spiral spring configuration of the tape comprises:
    a rotatable member and a driven wheel attached to each other, the rotatable member being held within the retainer by said retainer; and
    a stationary member held by the retainer, said tape being of resilient material and attached at one end to the rotatable member and at the other end to the fixed member.
8. The invention as stated in claim 7, including a stationary magnetic head in cooperation with the tape.
9. The invention as stated in claim 7, wherein substantially the entire length of the tape is in a spiral coil form circumjacent the fixed member, except such portion of length of the tape needed for attaching to the rotatable member, during the non-translatable mode of the tape, said tape being in a partial spiral coil form circumjacent the fixed and rotatable members directly after said tape had been transported.
10. The invention as stated in claim 9, including an impeller wheel coupled to the driven wheel for accumulation of said partial spiral coil about the rotatable member during the translation mode of the tape wherein said partial spiral coil circumjacent the fixed member storing mechanical energy to retract the tape in said partial spiral form from about the rotatable member upon decoupling of the driven and impeller wheels.
11. The invention as stated in claim 1, wherein the spiral spring configuration of the tape comprises:
    a driven wheel having a first post integral therewith at its center, one end of the first post being rotatably held within the retainer, one end of the tape being secured to the first post; and
    a second post, fixedly held by the retainer, wherein the other end of the tape is attached thereto.
12. The invention as stated in claim 11, wherein the spiral spring configuration is substantially stored about the second post during its inoperative mode.
13. The invention as stated in claim 11, wherein said tape stores mechanical energy by virtue of translation thereof.
14. The invention as stated in claim 11, wherein the retainer has a first aperture exposing a portion of the periphery of the driven wheel.

15. The invention as stated in claim 11, wherein the driven wheel has a non-smooth periphery for enabling it to be driven.

16. The invention as stated in claim 15, including an impeller wheel having a non-smooth periphery coupled to the driven wheel.

17. The invention as stated in claim 16, wherein said tape stores mechanical energy by virtue of it being transported thus tightening a portion of its spiral spring configuration about the second post, and wherein the tape is automatically retracted so as to return same to its initial configuration, prior to being transported, about the second post by virtue of release of the stored energy when the driven wheel is decoupled from the impeller wheel.

18. The invention as stated in claim 16, including a motor coupled to the impeller wheel.

19. The invention as stated in claim 18, including a cam coupled to the motor.

20. The invention as stated in claim 19, including a switch in cooperation with the cam.

21. The invention as stated in claim 20, including a push button electrically connected to the switch and providing power to the motor upon momentary actuation thereof.

* * * * *